United States Patent [19]

Smith, Sr.

[11] Patent Number: 4,509,447
[45] Date of Patent: Apr. 9, 1985

[54] HELICAL SEAMED STRUCTURAL VESSEL AND METHOD OF FORMING SAME

[75] Inventor: Richard H. Smith, Sr., Bloomfield, N.J.

[73] Assignee: Universal Spiralweld Enterprises, Inc., Bloomfield, N.J.

[21] Appl. No.: 508,509

[22] Filed: Jun. 28, 1983

Related U.S. Application Data

[63] Continuation-in-part of Ser. No. 282,082, Jul. 10, 1981, Pat. No. 4,429,654.

[51] Int. Cl.³ ............... B63B 9/06; B63B 3/00; F16L 9/16; F16L 9/18
[52] U.S. Cl. .................. 114/65 R; 138/148; 138/154; 138/113; 138/114; 138/149; 138/150
[58] Field of Search ............ 114/65 R; 138/150, 148, 138/154, 113, 114, 149; 220/414, 83, 3; 242/7, 23

[56] References Cited

U.S. PATENT DOCUMENTS 3,693,648 9/1972 Sassin .................. 138/113
4,068,478 1/1978 Meyers ................. 138/154
4,129,152 12/1978 Davis .................. 138/154
4,429,654 2/1984 Smith .................. 138/113

FOREIGN PATENT DOCUMENTS 1074929 2/1960 Fed. Rep. of Germany ...... 138/150
2045069 9/1970 Fed. Rep. of Germany ...... 138/150
46-34833 10/1971 Japan .................. 138/150

Primary Examiner—Trygve M. Blix
Assistant Examiner—C. T. Bartz
Attorney, Agent, or Firm—Watson, Cole, Grindle & Watson

[57] ABSTRACT

A double-wall structural vessel includes an inner tubular liner and an outer tubular shell surrounding the liner in spaced relation, both the liner and the shell comprising helically curved strips of material, and a continuous and helically curved spacer/stiffener therebetween. The liner and shell are relatively shifted axially such that the shell edges are out of alignment with the liner edges, and the spacer spans contiguous edges at successive turns of the liner as well as at successive turns of the shell, and is secured to the strips as well as to the liner edges and to the shell edges.

8 Claims, 4 Drawing Figures

U.S. Patent
Apr. 9, 1985
4,509,447
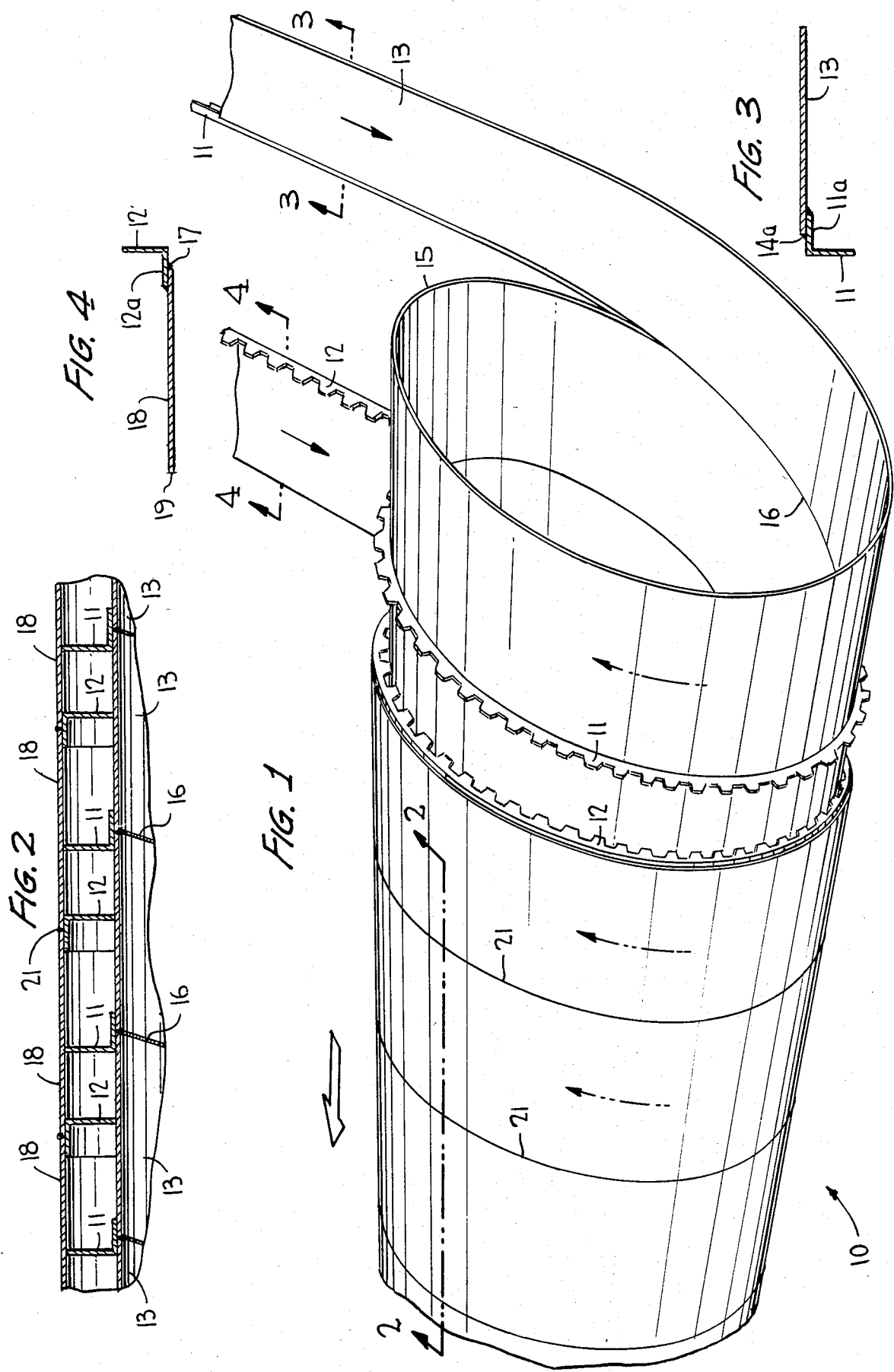

HELICAL SEAMED STRUCTURAL VESSEL AND METHOD OF FORMING SAME

RELATED APPLICATION

This application is a continuation-in-part of my copending U.S. application Ser. No. 282,082, filed July 10, 1981, now U.S. Pat. No. 4,429,654, issued Feb. 7, 1984.

BACKGROUND OF THE INVENTION

This invention relates generally to a double-walled helical seamed structural vessel and a method of forming same, the vessel having a helically wound stiffening spacer between its walls.

A structural vessel of this general type is set forth in the aforementioned related application as a unique and improved construction over prior art double-walled and reinforced single walled tubular vessels. In accordance with my earlier approach as therein set forth, an inner tubular liner and an outer tubular shell spaced about the liner each comprise helically curved strips of material, with helically wound spaced means between the liner and shell spanning contiguous edges at successive turns of the liner as well as spanning contiguous edges at successive turns of the shell. The contiguous liner edges are seamed together as by welding, and the spacer means secured to the strips forming the liner and shell via such welding means by disposing the spacer at the contiguous edges of the liner and at the contiguous edges of the shell, and by securing the spacer to the liner and shell by way of the welds used in seaming together these contiguous edges. The structural integrity and strength of the vessel are therefore vastly improved. Also, the process carried out for fabricating such structural vessel is simplified, labor saving and economical.

Although this design achieves and even surpasses all its expectations, it has been found that by using a slightly different fabricating technique, a double-walled, helically seamed structural vessel can be formed even more quickly and efficiently than before, while enhancing the structural integrity of the vessel. The need for tracking the narrow webs of the spacer on one another in accordance with my earlier approach, can be avoided. And, because the web tips of the inner beam section slightly fan out when helically wound, and the tips of the outer beam section slightly contract when helically wound, care must be taken when cutting the beam along an undulating line so as to ensure matching web tips between the beam sections during the fabricating process.

SUMMARY OF THE INVENTION

It is therefore an object of the present invention to provide a double-walled structural vessel of spaced helically wound strips with a helically wound spacer/stiffener therebetween which presents another option to my earlier design, while at the same time retaining a simplified fabricating approach which produces a vessel of large diameter having improved strength characteristics and structural integrity.

Another object of this invention is to provide such a double-walled structural vessel in which the liner and the shell are relatively shifted axially such that the shell edges are out of alignment with the liner edges, and including means such as welding for securing spacer means to the strips and the contiguous liner edges together as well as the contiguous shell edges together.

A further object of this present invention is to provide such a double-walled structural vessel in which the spacer means, which may comprise beam sections having flanges extending along the liner edges and along the shell edges, are likewise secured to confronting surfaces of the strips between opposing edges thereof.

A still further object of this invention is to provide such a double-walled structural vessel wherein one of the beam sections is secured to one of the edges of one of the strips before winding same to form the liner, and the other of contiguous edges at the successive turns of the liner is secured to such one edge and to the one section, and the other of the beam sections is secured at one of the edges to the other strip before winding same to form the shell, and the other of the contiguous edges at the successive turns of the shell is secured to such one edge of the other strip and to such other beam section, and the ends of the beam sections opposite their flanges are secured to confronting surfaces of the strips.

Other objects, advantages and novel features of the invention will become more apparent from the following detailed description of the invention when taken in conjunction with the accompanying drawings.

BRIEF DESCRIPTION OF THE DRAWINGS

FIG. 1 is a perspective view illustrating the technique used in fabricating the structural vessel according to the invention;

FIG. 2 is a cross-sectional view of the formed vessel taken substantially along the line 2—2 of FIG. 1;

FIG. 3 is a cross-sectional view of the inner liner with a spacer section secured thereto, taken substantially along the line 3—3 of FIG. 1; and FIG. 4 is a cross-sectional view of the outer shell with a spacer section secured thereto, taken substantially along the line 4—4 of FIG. 1.

DETAILED DESCRIPTION OF THE INVENTION

Turning now to the drawings wherein like reference characters refer to like and corresponding parts throughout the several views, a helical seamed, double-walled structural vessel according to the invention is shown in FIG. 1, generally designated 10, in the process of being fabricated with a portion thereof, shown at the left in the Figure, having been completed. The vessel is hollow and preferably cylindrical, although it may be of varying diameter, and may have conical end caps to facilitate easy towing in a body of water, similarly as in my aforementioned related application.

As will be seen, the structural vessel according to the invention is similar to my earlier developed vessel in that it comprises a helically wound inner liner surrounded in spaced relation by a helically wound outer shell with helically wound spacer means between the liner and shell secured thereto via means which also secures the contiguous liner edges together and which secures the contiguous shell edges together. Such spacer means, which is continuous and also functions as a stiffener, may for example be produced in a known manner from a structural I-beam, double T-beam, channel-shaped beam or Z-shaped beam by separating the beam web along an undulating or trapezoidal line to form individual beam sections 11 and 12 having castellated webs which facilitate bending while being helically wound. Otherwise, continuous bars of rectangular cross-section capable of bending when helically wound, can be utilized without departing from the invention.

In the process of fabricating the vessel, a continuous inner strip 13 of material, such as plate steel, is wound from a supply (not shown) in a helical manner about a series of forming rolls such as shown in my parent application, to thereby form an inner tubular liner. Appropriate tube forming means will be utilized for forming the helical turns from a continuous or laterally spliced strip. Before winding, beam section 11 is fillet welded for example along a leading edge 14 of the inner strip with approximately one-half its flange 11a extending outwardly of this edge. This extended flange portion is lapped over a trailing edge 15 of the next adjacent formed helical turn and a butt weld 16 is applied for joining the contiguous leading and trailing edges of the inner turns together via beam section 11.

Beam section 12 may then be fillet welded along a trailing edge 17 of an outer strip 18 of material, such as plate steel, with substantially one-half flange 12a of section 12 extending outwardly of this edge as shown. The outer strip is then helically wound about the inner strip and is maintained axially shifted relative thereto such that the edges of the outer strip are out of alignment with the edges of the inner strip, as shown in FIGS. 1 and 2, whereby the web tips of beam section 11 confront the inner surface of strip 18, and the web tips of beam section 12 confront the outer surface of strip 13. In such manner, the web tips of the beam sections are respectively disposed between the opposing edges of the strips which confront them. And, a leading edge 19 of outer strip 18 overlaps the exposed portion of flange 12a on an already wound outer strip and is fillet welded to the trailing edge of that strip after which the seam at these edges is butt welded together as at 21 via beam section 12. The web tips of both beam sections are then fillet or fusion welded to the respective surfaces of the wound strips which they confront.

Support roller assemblies (not shown) are provided at opposite lower sides of the formed vessel and form a cradle support within a work housing (also not shown), similarly as in the aforementioned related application. And, such cradle support may be located within a work housing which is water bouyant and which has an opening in a side wall thereof through which the formed structural vessel progressively extends in the direction of the arrow of FIG. 1 during the fabrication process, all as set forth in my related application.

Moreover, while the outer strip is being wound in place, concrete may be pumped into the space between the strips for structural purposes, weep holes being provided in the inner liner for known purposes. And, the inner liner may be covered with a thin concrete lining during the fabrication process to protect the steel vessel against corrosion when, for example, used as a water aqueduct.

From the foregoing, it can be seen that a double-walled, web stiffened, and helically seamed structural vessel is capable of being quickly and efficiently produced in accordance with the present invention which provides another option and several advantages over my former design. For example, during the fabrication process of vessel 10 according to the invention, the narrow webs of the spacer ribs need not be tracked as in my former design since the tips of these webs are now welded along confronting respective surfaces of the inner and outer strips. And, since during the winding of the ribs the web tips of the inner section slightly fan out and the web tips of the outer section slightly contract, care must be taken in properly cutting the beam web along an undulating line so that the tips of the castellated webs produced will match as closely as possible during the fabrication process. The present invention avoids these potential difficulties because the web tips between beam sections do not confront and need not match.

The present structural vessel is capable of different and varied uses, and the overall buckling strength is sufficient to eliminate the need for bulk heads or deep frames. Also, thinner strips may be utilized without compromising strength and structural integrity, and all the other advantages such as set forth in my parent application are made possible for the present structure.

Obviously, many modifications and variations of the present invention are made possible in the light of the above teachings. It is therefore to be understood that within the scope of the appended claims the invention may be practiced otherwise than as specifically described.

What is claimed is:

1. A structural vessel, comprising an inner tubular liner and an outer tubular shell surrounding said liner in spaced relation, said liner and said shell comprising helically curved strips of material, continuous and helically curved spacer means between said liner and said shell, said spacer means spanning contiguous edges at successive turns of said liner and spanning contiguous edges at successive turns of said shell, said liner and said shell being relatively shifted axially such that said shell edges are out of alignment with said liner edges, means securing said spacer means to said strips and said liner edges together as well as said shell edges together.

2. A vessel according to claim 1, wherein said spacer means comprise beam sections having the bases thereof extending along said liner edges and along said shell edges.

3. The vessel according to claim 1, wherein said spacer means are secured to confronting surfaces of said strips between opposing edges thereof.

4. The vessel according to claim 2, wherein ends of said beam sections opposite said bases are secured to confronting surfaces of said strips between opposing edges thereof.

5. The vessel according to claim 4, wherein said beam sections have webs of toothed formation at said ends thereof.

6. A method of forming a structural vessel, comprising the steps of:
helically winding one strip of material to form an inner tubular liner;
helically winding another strip of material surrounding said liner in spaced relation to form an outer tubular shell;
disposing continuous, helically curved, separate spacer means between said liner and said shell, said spacer means spanning contiguous edges at successive turns of said liner and spanning contiguous edges at successive turns of said shell;
during said winding steps, maintaining said liner and said shell relatively shifted axially such that said shell edges are out of alignment with said liner edges;
securing together said spacer means and said strips including respectively securing together said liner edges and said shell edges such that said liner edges and said shell edges are secured together via said spacer means.

7. The method according to claim 6, wherein said spacer means comprises beam sections having bases extending along said liner edges and along said shell edges, and joining ends of said sections opposite said bases to surfaces of said strips which confront said ends.

8. The method according to claim 6, wherein said spacer means comprise beam sections having bases, securing one of said sections at one of said edges of said one strip before winding same to form said liner, securing the other of said contiguous edges at said successive turns of said liner to said one edge and to said one section, securing the other of said sections at one of said edges of said another strip before winding same to form said shell, securing the other of said contiguous edges at said successive turns of said shell to said one edge of said another strip and to said other section, and securing ends of said sections opposite said bases to confronting surfaces of said strips.

* * * * *